May 1, 1962  SHINZO SUMIYA  3,032,199
FROTH FLOTATION SYSTEM
Filed Feb. 1, 1960  2 Sheets—Sheet 1

INVENTOR.
SHINZO SUMIYA

May 1, 1962 SHINZO SUMIYA 3,032,199

FROTH FLOTATION SYSTEM

Filed Feb. 1, 1960 2 Sheets-Sheet 2

INVENTOR.
SHINZO SUMIYA

United States Patent Office 3,032,199
Patented May 1, 1962

3,032,199
FROTH FLOTATION SYSTEM
Shinzo Sumiya, 860 Hagoromo, Takaishi-cho,
Senboku-gun, Osaka, Japan
Filed Feb. 1, 1960, Ser. No. 5,848
Claims priority, application Japan May 4, 1959
3 Claims. (Cl. 209—170)

This invention relates to a froth flotation system, and more particularly to improvements in the apparatus for removing particles or ingredients from the liquid used in the viscose rayon industry. The improved apparatus can also be employed in itself for dressing ores.

According to the conventional art, the particle suspending liquid is introduced into and allowed to pass through the vessel, and a gaseous medium such as air is generated in the liquid in such a manner that the resulting particle carrying foams flow into the deflectors mounted in the upper portion of the vessel. The particles thus collected are allowed to pass out of the system by way of a conduit or launder communicating with the deflectors. Most of the surface active agent present in the liquid is collected together with the particles. Any gaseous substance eventually contained in the liquid is also collected together with the air for further treatment. The liquid thus clarified or purified is led out of the system by way of an outlet pipe.

The clarifying effect of the system depends upon various factors, such as the unit volume and temperature of the gaseous medium employed, the amount of froth generated in the liquid, the viscosity and temperature of the liquid being treated, the distance between the froth generating means provided in the vessel and the level of the liquid, the shape and arrangement of the deflectors, the size of the scum passages between the deflectors, and the like. Depending on the type of factories and the processes employed, moreover, the liquid to be treated with is not necessarily of a uniform nature, and even the particles present in the same liquid are occasionally of different kinds and sizes.

These factors, however, can hardly be modified, once the system is permanently fixed, and the modification requires complicated skills and eventual drawbacks in the total efficiency of the system. It is therefore impracticable to employ a definite system to a variety of liquids to be treated with. The improvements of this invention are so contrived as to remove these inconveniences.

The object of this invention is accordingly to provide a system which can be adapted to a variety of liquids irrespective of their species and the size and property of the particles present therein.

The froth flotation system of this invention essentially consists of a vessel for holding the liquid to be treated; a plurality of air conduit pipes transversely mounted near the bottom of the vessel and horizontally spaced at an equal distance from one another; a plurality of V-shaped troughs or deflectors transversely mounted in the upper portion of the vessel and horizontally spaced at an equal distance from one another; a conduit or launder communicating with the deflectors and longitudinally mounted on the outside of one of the side walls of the vessel so as to evacuate therethrough the particles discharged from the deflectors; a plurality of segmenting plates transversely mounted in the vessel and vertically spaced at an equal distance from one another for securing the regular upward movement of the particle carrying foams; and a plurality of transverse wedge-shaped members movably suspended in the uppermost portion of the vessel with each of the bottom edges projecting into the central portion of each of the scum passage spaces between the deflectors, so as to freely modify the width of the scum passage space by mechanically moving the members upward and downward in accordance with the nature of the liquid and with the size and property of the particles present therein. Each of the air conduit pipes communicates with the air blower, and is provided in the upper portion with small openings for generating foams under a suitable pressure. A material like porous tile, porous plate of vinyl or carbon, and the like, can be employed as the foam-generating medium. Each of the segmenting plates is provided in the body thereof with sizable openings for the longitudinal movement of the liquid being treated.

Thus a feature of this invention consists in the provision of the movable wedge-shaped members for freely and mechanically adjusting the aperture of the scum passage space so as to meet a variety of liquids and particles present therein with a single unit of the system.

Another feature of the invention is that the optimum passage for the particle carrying scums is obtained by means of the wedge-shaped members so as to prevent the scums from staying unnecessarily long upon the surface of the liquid. The total efficiency of the system is thereby maintained in the maximal conditions irrespective of the nature of the liquid and of the size and property of the particles suspended in the liquid.

Other objects and features of the invention may be readily understood from the following disclosure made in accordance with the attached drawings, of which:

FIGURE 1 is a longitudinal sectional view of a preferred embodiment of the invention;

FIGURE 2 right is a transversal sectional view along the line I—I of FIGURE 1;

FIGURE 2 left is another transversal sectional view along the line II—II of FIGURE 1;

Figure 1:
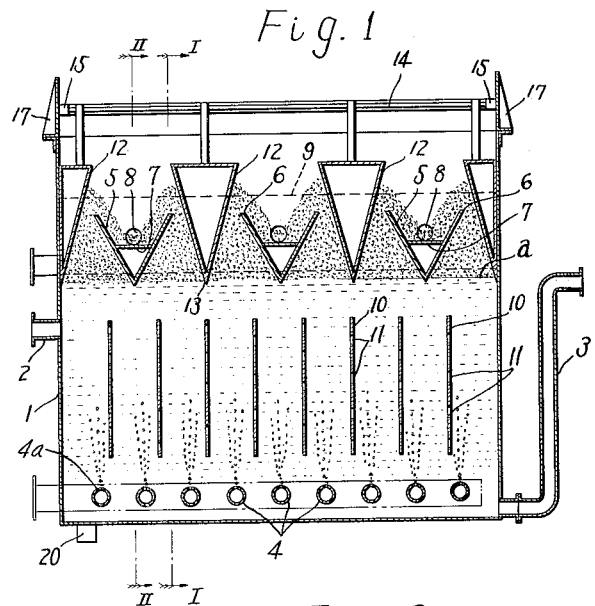

In the embodiment shown in the accompanying drawings, the liquid holding vessel 1 is provided in one side wall with a liquid intake 2 and in the other with a liquid outlet 3. Air conduit pipes 4, each of which communicates with an air blower, not shown, and is provided in the upper portion with small openings 4a for uniformly introducing the air into the liquid being treated, are transversely mounted near the bottom of the vessel 1 and horizontally spaced at an equal distance from one another. V-shaped troughs or deflectors 5 are transversely mounted in the upper portion of the vessel 1 right above the liquid level a under normal operating conditions and horizontally spaced at an equal distance from one another, so that the particle-carrying foam flows over the upper rims 6 of each of the V-shaped deflectors 5 into the interior of the latter and collects upon the false bottom 7 provided in each of the deflectors 5. Each of the deflectors 5 is further slightly tilted downwardly toward one end thereof and projects with said end through one side wall of the vessel 1 by way of an opening 8, so that the particles, collected upon the false bottoms 7, pass through the openings 8 and flow into the conduit 9 communicating with the discharge ends of the deflectors 5 and mounted longitudinally on the outside of the vessel 1, to be finally evacuated therethrough out of the system.

In the instant embodiment described above there are employed segmenting plates 10 for facilitating the upward movement of the particle carrying foams. Said segmenting plates 10 are transversely mounted in upright position in the vessel 1 and horizontally spaced from one another in alternating position with the air conduit pipes 4. The upper ends of the segmenting plates 10 extend almost to the liquid level a. Each of the segmenting plates 10 is further provided in the body thereof with sizable openings 11 causing substantially horizontal flow of the treated liquid in longitudinal direction through the vessel. In other words, the particle carrying foams travel upward in a uniform movement through the passages between the segmenting plates 10, while the liquid travel from left to right through the openings 11 of one segmenting plate after another. The liquid thus purified or clarified is led out of the vessel 1 by way of the outlet 3.

Figure 2:
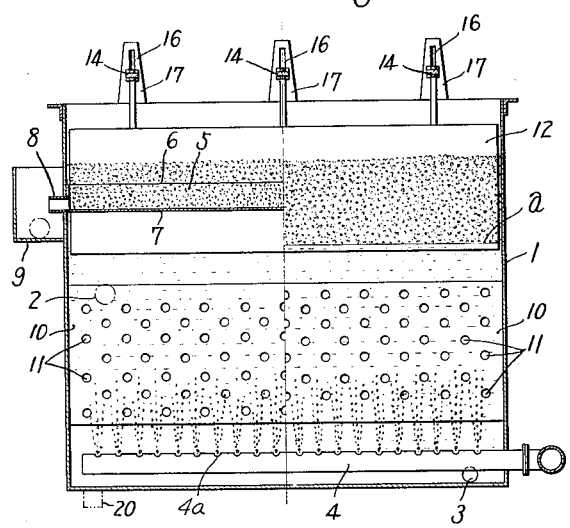
Figure 3:
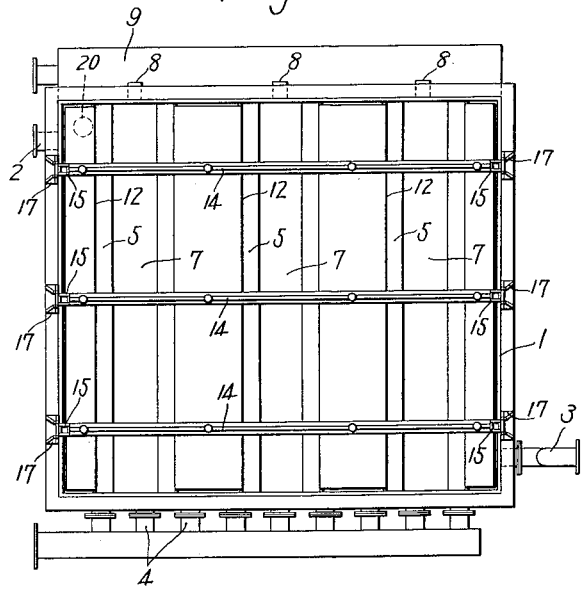
FIGURE 3 is a top plan view of FIGURE 1.
Figure 4:
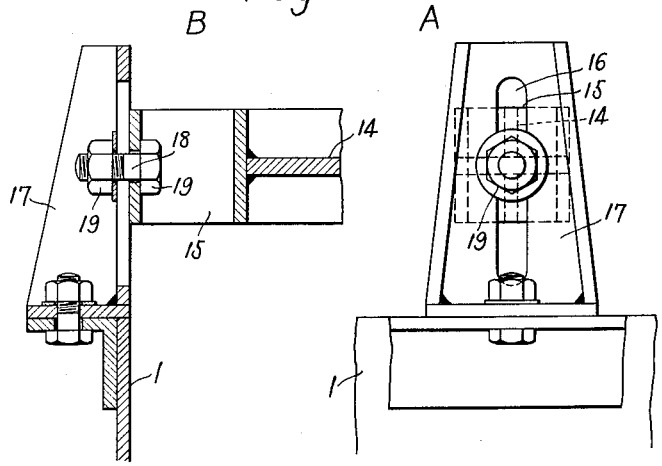
FIGURE 4A is an enlarged front elevation of a preferred mechanism for fixing the movable wedge-shaped member of this invention.
FIGURE 4B is a side elevation of FIGURE 4A.

Another very important feature of the embodiment illustrated in FIGURES 1 and 2 consists in the employment of a plurality of transverse wedge-shaped members 12 which are movably suspended in the uppermost portion of the vessel 1 with each of the bottom edges 13 projecting into the central portion of each of the scum passage spaces between the deflectors 5. With the lower edge of each wedge-shaped members 12, there is aligned one of the segmenting plates 10. The wedge-shaped members 12 are suspended from horizontal bars 14 longitudinally extending across the vessel 1. Each bar 14 has two ends each of which is mounted adjustably as to height in a vertically extending elongated opening 16 which is provided in each of a pair of arms 17, secured to the upper rim of the opposite end walls of the vessel 1, so that each of the scum passage spaces between the deflectors 5 can be freely modified in accordance with the nature of the liquid and with the size and kind of the particles present in the liquid by mechanically raising or lowering the bars 14 from which the wedge-shaped members are suspended. In fixing the bars 14 at a desired position, bolts 18 and nuts 19 are employed as shown in FIGURES 4A and 4B. Other suitable devices such as cogwheels and the like may also be employed. Wedge-shaped members 12 are not necessarily hollow as shown in FIGURE 1, but they shall be heavy enough to resist the buoyancy of the particle carrying scums. Drainings are cleared off by way of opening 20.

Having described hereinbefore my invention relative to a preferred embodiment of the same, it is my intention not to confine the invention thereto, since various changes and modifications are possible within the scope and spirit of the invention as set forth in the appended claims.

What I claim is:

1. A froth flotation system comprising a liquid-holding vessel, means for passing a stream of liquid containing suspended particles therethrough in a determined direction of flow and maintaining a determined level of said liquid therein, froth generating means mounted near the bottom of said vessel, a plurality of trough-shaped deflector means of substantially V-shaped cross section, said deflector means being mounted in the upper portion of said vessel in such position that the apex of each deflector means forms a bottom edge substantially at the level of the liquid passing therethrough, and transversely to the direction of flow of said liquid, and being spaced horizontally from each other so as to form a plurality of spaces for the free upward passage of scum between said deflector means, said trough-shaped deflector means being adapted for discharging from said vessel, froth overflowing into their interior; a plurality of wedge-shaped members mounted in said vessel parallel to said deflector means and each with its lower wedge edge centrally in one of said scum passage spaces; and means for raising and lowering each of said wedge-shaped members relative to said deflector means, so as to adjust the width of the respective scum passage space depending on the nature of the liquid and the kind and size of particles suspended therein.

2. The froth flotation system as set forth in claim 1, further comprising a plurality of segmenting plates transversely mounted in the vessel and horizontally spaced from one another at determined distances for insuring the regular upward movement of the particle carrying foams, with each plate provided with sizable openings for the longitudinal passage of the liquid being treated, each of a number of said plates being so mounted as to be in alignment with the bottom edge of one of said wedge-shaped members and the distances between adjacent plates being such that the bottom edges of said V-cross-sectioned deflectors are substantially in alignment with the central planes of the spaces between pairs of said plates.

3. In the froth flotation system having a liquid holding vessel provided with means for passing a stream of liquid therethrough, froth generating means transversely mounted near the bottom of the vessel, and a plurality of deflectors having a V-shaped cross section and being transversely mounted in the upper portion of the vessel with their lower edge substantially at the level of liquid passing therethrough and horizontally spaced at a suitable distance from one another so as to form a plurality of spaces for the free passage of scum upward between adjacent deflectors, said deflectors, each communicating at one end with a conduit longitudinally mounted on the outside of one side wall of the vessel; the combination of a plurality of transverse wedge-shaped members movably suspended in the uppermost portion of the vessel, each of said members having a bottom edge which projects into the central portion of each of the scum passages between the deflectors, and means for moving each of the wedge-shaped members upward and downward so as to freely modify the width of the respective scum passage space in accordance with the nature of the liquid being treated and with the size and kind of the particles present therein.

References Cited in the file of this patent
UNITED STATES PATENTS

| | | |
|---|---|---|
| 1,367,332 | Town et al. | Feb. 1, 1921 |
| 1,478,703 | Dolbear | Dec. 25, 1923 |
| 1,746,682 | Ruth | Feb. 11, 1930 |
| 2,072,880 | Hoag | Mar. 9, 1937 |